TELEVISION PROGRAM RATING AND RECORDING APPARATUS

Filed Oct. 7, 1957 4 Sheets-Sheet 1

INVENTORS R. C. AVERY
F. E. BLOUNT
BY
A. M. Hassell
ATTORNEY

Feb. 2, 1960 R. C. AVERY ET AL 2,923,771

TELEVISION PROGRAM RATING AND RECORDING APPARATUS

Filed Oct. 7, 1957 4 Sheets-Sheet 2

INVENTORS R. C. AVERY
F. E. BLOUNT
BY A. M. Hassell
ATTORNEY

INVENTORS R. C. AVERY
F. E. BLOUNT
BY
A. M. Hassell
ATTORNEY

Feb. 2, 1960 R. C. AVERY ET AL 2,923,771

TELEVISION PROGRAM RATING AND RECORDING APPARATUS

Filed Oct. 7, 1957 4 Sheets-Sheet 4

INVENTORS R. C. AVERY
F. E. BLOUNT
BY
A. M. Hassell
ATTORNEY

United States Patent Office 2,923,771

Patented Feb. 2, 1960

2,923,771

TELEVISION PROGRAM RATING AND RECORDING APPARATUS

Robert C. Avery, Jackson Heights, N.Y., and Frank E. Blount, Cedar Grove, N.J., assignors to Bell Telephone Laboratories, Incorporated, New York, N.Y., a corporation of New York Application October 7, 1957, Serial No. 688,749

17 Claims. (Cl. 179—2)

This invention relates to apparatus for indicating substantially instantaneously and at a common point the proportion of a group of stations which reside in a preselected condition. More particularly, this invention relates to apparatus for obtaining data concerning the number of commercial broadcast receivers tuned to a particular frequency or channel at any given instant. The term "broadcast receiver" is here intended to encompass receiving sets for television or AM or FM radio.

While a number of systems for sampling the listening habits of radio audiences are known, some of which are based upon written or operator-placed telephonic polls and others upon records made at selected receiving sets, such known systems have many undesirable features. Systems which depend upon local recording apparatus are slow in making data available and are difficult and expensive to install, operate and maintain. Operator-placed telephonic polls make data available much more quickly but are much more costly, are severely limited in the number of receiver locations that can be checked during any particular time period, and depend much upon human factors such as the competence of the operators and the cooperation of the persons who answer their telephones.

In an effort to overcome these shortcomings, systems incorporating sending units at each participating receiver and a central recording station connected to all of such sending units have been suggested. Heretofore such systems have been characterized by comparatively complex equipments at both the receivers and the central station. Such equipments have required by their very nature the provision of individual communication paths for data transmission between each receiver location and the central recording station. In certain embodiments telephone lines have been utilized as such transmission paths, thereby rendering such lines unavailable for conventional telephone service.

One general object, therefore, of this invention is to provide an accurate, low-cost and high-speed system for measuring and recording the prevalence of certain preselected conditions which may occur at widely separated geographical locations. What is particularly desired is a system which will determine at once the proportion of a preselected group of participating broadcast receivers which are operating and, of these, the number which are tuned to any particular station or channel.

Another object of the invention is to provide means by which any of a plurality of subscribers to such a data-gathering system can remotely select the stations or channels to be tested.

Still another object of the invention is to provide apparatus which accomplishes the results desired without the full-time employment of a telephone line between each participating broadcast receiver and the central station.

Accordingly, in accordance with one feature of this invention certain apparatus is connected to the telephone set and to the central office terminals of a conventional telephone line thereby obviating the necessity of employing a separate telephone line for each participating receiver.

In accordance with another feature of the invention apparatus is provided which is attached to the participating receiver, is connected in parallel with the telephone line at the telephone set, and bridges such line through an inductive shunt whenever the central office tests for a condition which corresponds to the condition in which the participating receiver is resident.

According to still another feature of the invention apparatus is employed at the central office to provide unrestricted availability of the telephone set for incoming calls. This is accomplished by advantageously diverting the output of certain of the line supervisory equipments, and by connecting the common test apparatus to a particular point on each participating telephone line.

In accordance with yet another feature of the invention, unique combinations of control, selection and timing apparatus are provided at the central office for applying test signals to all non-busy telephone lines which are associated with participating receivers and for recording the results of such tests. The apparatus is so arranged that a request for such a test by a data-gathering service subscriber and the completion of the requested test occur substantially simultaneously.

According to a further feature of the invention the lines associated with the participating receivers to be tested are divided into a plurality of groups which are tested sequentially with only a limited number of lines from the same telephone cable being included in any one group thereby reducing the possibility of inducing "cross-talk" in such cables.

Briefly, the invention comprises a registering unit attached to the tuning control of each participating broadcast receiver, testing and recording apparatus at the telephone central office, a conventional telephone line between the central office and each point at which a participating receiver is located, channel test requesting apparatus located at the premises of each of the data-gathering service subscribers, and leased telephone lines between each of such premises and the central office. Consequently, in the selection of receivers for participation in the data-gathering service only those receivers are considered which are situated at locations where conventional telephone service is available.

The central office, upon a request by a data-gathering service subscriber, applies a particular frequency tone to the telephone lines leading to the participating receivers. If a receiver is operating and tuned to the station or channel for which the test is being made, the applied tone causes the registering unit at the receiver to operate the line relay associated with that particular receiver at the central office. The office records the total number of line relays operated.

Additional objects and features will be apparent from the following description of one embodiment of the invention, the appended claims, and the drawings in which Fig. 1 is a sketch depicting a rotary switch for registering the orientation of the receiver tuning control;

It should be noted from the drawings that the well-known "detached contact" method of schematically depicting electrical circuits has been employed. In this method all contacts of a relay are assigned the same reference symbol. The symbol assigned is identical to the symbol given to the corresponding relay winding. In this specification wherever contacts of a relay appear in a figure wherein the relay winding does not also appear, the reference symbol assigned to the contacts is prefixed with a digit that corresponds to the number of the figure in which the winding is to be found. For example, the contacts of relay C3 (Fig. 5) are denominated as C3 throughout the same figure, but where contacts of relay C3 appear in Fig. 4 they are denominated as 5–C3, indicating that the coil of the relay is to be found in Fig. 5. It should be further noted that the specific embodiment herein described is intended to operate in cooperative association with the well-known No. 5 crossbar type of telephone system, disclosed by way of example in Patent No. 2,585,904, granted to A. J. Busch on February 19, 1952. Of course, the apparatus described could be used with any type of telephone system, the No. 5 crossbar system having been chosen only for purposes of illustration.

*Detailed description*

Figure 3:
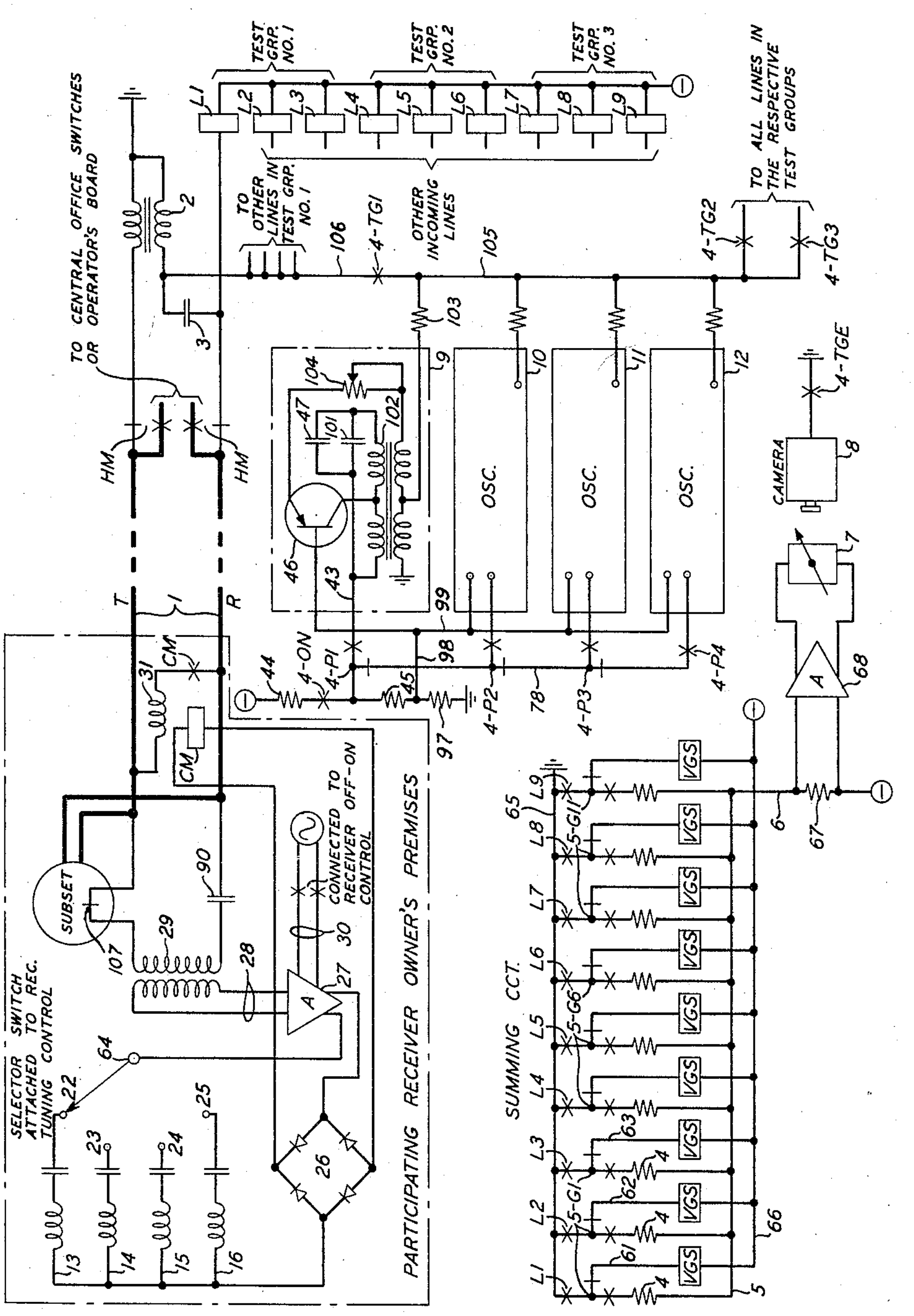
Fig. 3 is a schematic diagram of the equipment which is added to the telephone line at the telephone set together with certain associated central office equipment.
Figure 4:
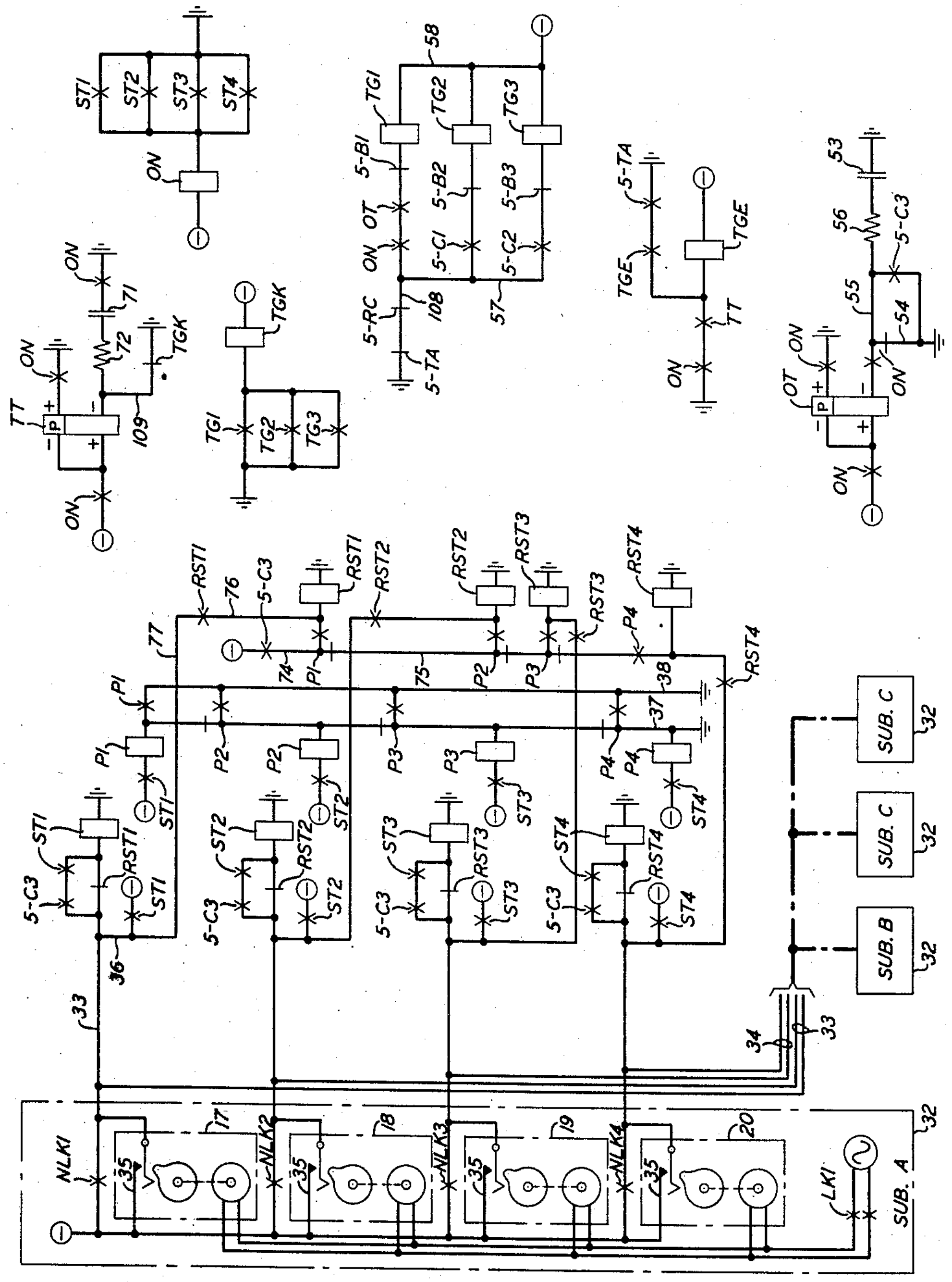
Figs. 4 and 5 are schematic diagrams of the control, selection, and timing circuits provided in the central office to control the equipment depicted in Fig. 3.
Figure 5:
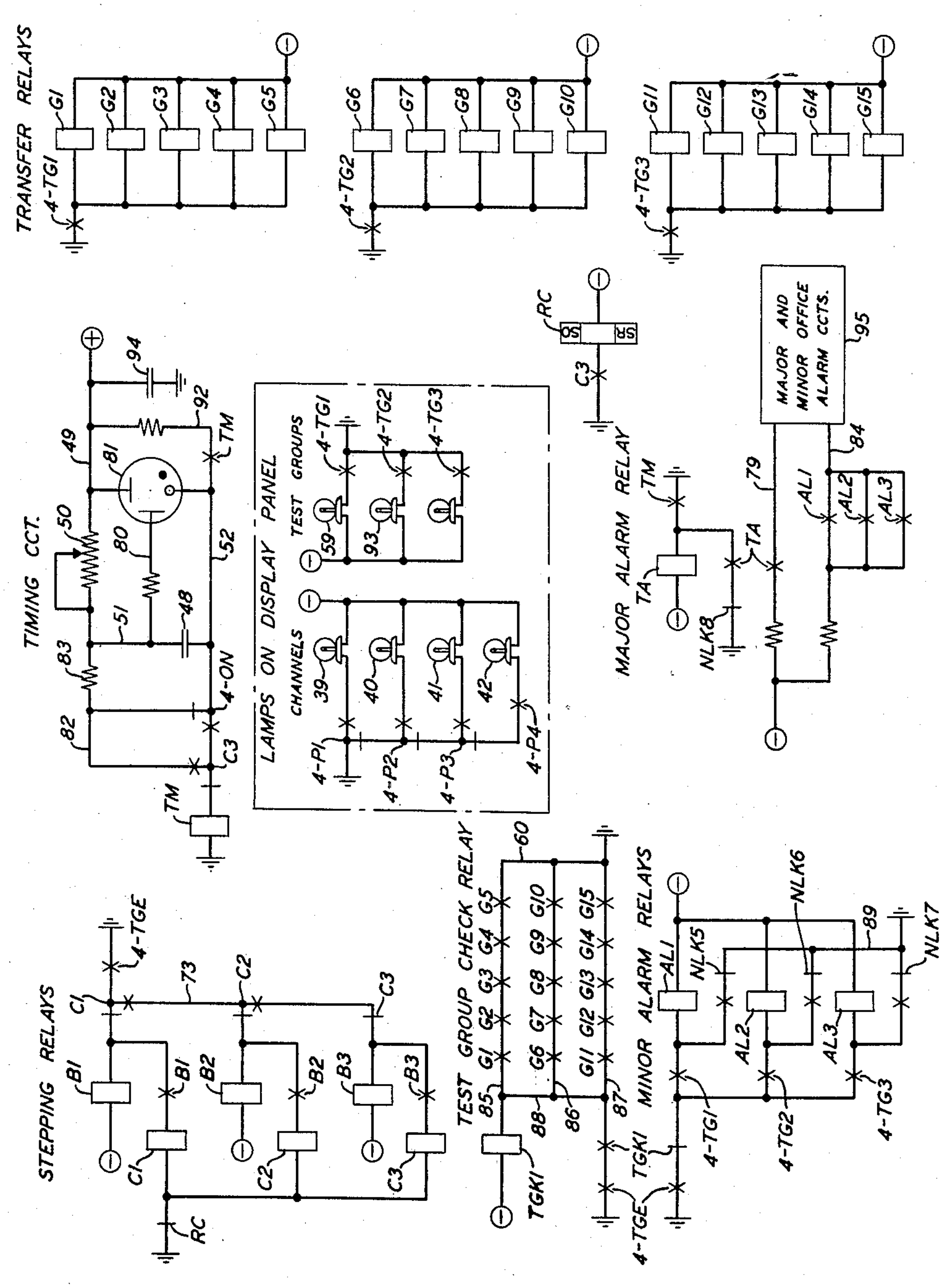

At the central office (Fig. 3) each participating receiver owner's telephone line 1 is modied by the addition of a transformer 2, capacitor 3, and a set of transfer contacts such as 5–G1 associated with a transfer relay such as G1 (Fig. 5). The relay, when operated, serves to divert the output of a line relay such as L1 from the machine switching equipment (shown as VGS windings of the above-mentioned No. 5 crossbar equipment) or the operator's board light, as the case may be, to a summing circuit comprising resistors 4 and conductor 5. The output 6 of the summing circuit in Fig. 3 is indicated on a meter 7 and the meter reading is recorded by an automatic camera 8. Common to all lines and connected to each line through a transformer 2 and capacitor 3 are a number of selectively operable oscillators 9–12 whose frequencies correspond to the resonant frequencies of tuned branches 13–16. The function of these branches is discussed more fully below. The oscillators 9–12, which are voice-frequency oscillators, are selected in Fig. 4 by non-locking keys NLK1–NLK4 or timing equipment 17–20 which are located at the premises of data-gathering service subscribers. Apparatus located at the central office and shown in Figs. 4 and 5 co-ordinates the operation of the oscillators, transfer relays, camera, and other equipment.

Figure 1:
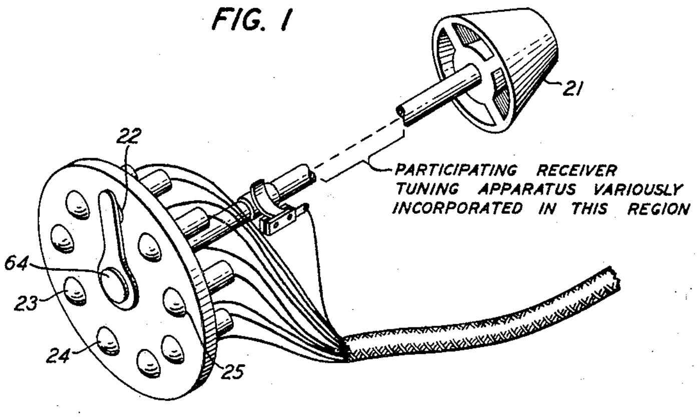

The tuning control 21 (Fig. 1) of each participating receiver is modified to include one set of contacts 22–25 for each station or channel which can be satisfactorily received by the receiver. The contacts are so arranged that whenever the tuning mechanism is in a position corresponding to a particular channel or station the contacts, for example contacts 22, corresponding to that channel or station are closed and all other pairs of contacts, 23–25, corresponding to all other available channels or stations, are open. Although nine contacts and associated wires have been shown to comprise control 21, only four of them have been included in tuned branches such as 13–16. Of course, the number of branches, and correspondingly the number of contacts, would be a function of the number of available channels or stations. In Fig. 3 each of these contacts is included in a separate series-tuned branch 13–16. Each of these tuned branches has a separate and distinct resonant frequency corresponding to that of one of the oscillators mentioned above.

All of branches 13–16 are connected in parallel. This parallel group of tuned circuits is in turn connected to the output terminals of amplifier 27 through diode bridge rectifier 26. The amplifier input terminals 28 are connected to telephone line 1 through transformer 29. The amplifier power supply 30 is controlled by the participating receiver off-on switch (not shown). The output of the rectifier is connected across the operating winding of a shunting relay CM which, when operated, joins the ring and tip conductors of telephone line 1 through an inductive shunt 31.

When a signal of a particular frequency is applied to the telephone line and the receiver is turned on, an amplified signal of like frequency is applied to a circuit which comprises bridge diode rectifier 26 and the parallel branches 13–16. The tuned branch, for example, branch 13, whose contacts are closed, presents a low impedance to current flowing through the rectifier when the applied frequency corresponds to the resonant frequency of the branch. Otherwise the branch appears as a substantially open path in the rectifier circuit. When the applied frequency does so correspond, current flows through bridge rectifier 26 thereby operating shunting relay CM. This operation completes a direct-current path from the ring to the tip conductors of line 1 but does not shunt the applied frequency because the value of the inductance of inductor 31 is selected in such a manner that the inductor appears as a substantially open circuit to the voice-frequency signals produced by oscillators 9–12.

Of course, a number of alternative arrangements for effectively completing a direct-current path between the ring and the tip conductors of line 1 will be apparent to those skilled in the art. For example, the inductor 31 may be omitted and normally open contacts of relay CM may be included in series with a shunt around capacitor 90. The capacitor is chosen in such a manner that it is an effective short circuit to the voice-frequency signals produced by oscillators 9–12.

The operation of the shunting relay CM completes an operating path for the line relay associated with the line, in this case relay L1 which is located at the central office. Line relay L1 normally responds to the initiation of a call by operating its associated VGS relay. However, when a test is being performed on line 1 transfer relay G1 is operated and it diverts current away from the VGS winding to resistors 4 in the summing circuit. A record is made by camera 8 of the total current flowing in the summing circuit. This current flow record, together with a knowledge of the total number of lines tested and the incremental current flow due to the operation of each line relay, is sufficient to determine the number of receivers tuned at the time of the test to the station or channel for which a test is made.

It should be noted that relays L1–L9 and their associated lines have been divided into three test groups of three lines each. The apparatus described in Figs. 4 and 5 is arranged to test these groups sequentially. While only three lines and their associated line relays have been shown to comprise a test group it is contemplated that 1000 lines could conveniently comprise each of such groups. The sequential testing feature is required by the fact that should a test tone be simultaneously connected to an excessive number of lines in one telephone cable, cross-talk would occur, producing noise in adjacent telephone circuits transmitting conventional voice conversations. The possibility of such an occurrence is avoided in the present invention by dividing the lines to be tested in any one cable between two or more test groups. As a result, no more than a predetermined critical number of lines in any one cable are tested simultaneously.

The lines are transferred as complete groups by the G– relays in order that a line will be withdrawn from its ready-for-outgoing-service condition only while the test for its group is being performed. As will be hereinafter more fully discussed, a line is always available for incoming calls. In Fig. 5, five transfer relays G– are shown associated with each test group. Of course, the number of relays actually used would be a function of the number of transfer contacts on each relay and the number of lines in each test group. Further, the number of test groups would be a function of the total number of participating receivers which it is desired to test.

Referring now to Fig. 4, each of subscribers A, B, C, and D are supplied with identical equipments 32, which are connected in parallel to the central office equipment over leased telephone lines 33 and 34. The four nonlocking keys NLK1–NLK4 severally correspond each to one of the automatic timing devices 17–20, oscillators 9–12, tuned branches 13–16, and the first, second, third, and fourth commercial broadcast channels, respectively. A data-gathering service subscriber, such as subscriber A, may initiate a test for the first channel either by manually operating nonlocking key NLK1 or by closing locking key LK1 in the power supply circuit for automatic timer 17. Automatic timing devices 17–20 are representative of any one of a number of well-known "time switches" which can be arranged to close their associated contacts 35 at preselected times.

The operation of key NLK1 or the closing of contacts 35 in timing device 17, as the case may be, connects battery to the one side of leased line 33 and operates start relay ST1 over a path from battery through key NLK1, the one side of line 33, normally closed contacts RST1, to the winding of relay ST1 and ground. Relay ST1 locks itself over a path from battery through normally open contacts ST1, conductor 36, normally closed contacts RST1, to the winding of relay ST1 and ground. In the event that none of preference relays P2–P4 have been operated, the operation of relay ST1 will complete a circuit for relay P1 which extends from ground on conductor 37 through normally closed contacts P4, P3, and P2, and the winding of relay P1 to normally open contacts ST1 and battery.

The preference chain P1–P4 is so arranged that the operation of any higher-numbered preference relay will disconnect ground from all lower-numbered relays by opening conductor 37 in the proper place. Accordingly a lower-numbered P– relay cannot operate if a higher-numbered relay has been operated thereby ensuring that testing will normally proced in the order P4, P3, P2, and P1. Thus it is necessary that relay P–1 lock itself operated over another path immediately upon operating in order to prevent its premature release before the completion of testing for the first channel in the event another subscriber, such as subscriber B, requests the testing for a higher-numbered channel during the progress of the test for the first channel. Relay P1 is therefore locked over a path from ground on conductor 38, through normally open contacts P1 and the winding of relay P1 to normally open contacts ST1 and battery. The operation of transfer contacts 4–P1 activates lamp 39 (Fig. 5,) corresponding to the first channel, and opens the path to lamps 40–42, corresponding to the second through the fourth channels. The lamps 39–42 are connected in a preference circuit similar to that for relays P1–P4. It should be noted that the transfer contacts 4–P1 . . . 4–P4 for the lamps 39–42 and similar transfer contacts 4–P1 . . . 4–P4 in the power supply circuits for oscillators 9–12 (Fig. 3) are arranged in such a sequence that the subsequent operation of higher-numbered P– relays during the progress of a test will not result in the energization of two or more lamps or cause the activation of two or more oscillators.

A further result of the operation of relay ST1 is the operation of off-normal relay ON (Fig. 4) over an obvious path. The operation of relays P1 and ON result in the activation in Fig. 3 of oscillator 9 over a path from ground through resistor 97, conductors 98 and 99, oscillator 9, conductor 43, normally open transfer contacts 4–P1 and normally open contacts ON to resistor 44 and battery. Resistors 97, 45, and 44 form a well-known voltage divider. Oscillator 9 is of a well-known type. Transistor 46 has a negative resistance characteristic and operates into a tank circuit composed of capacitors 47 and 101 and inductor 102. The load 103 is arranged in such manner and is of such magnitude that the transistor operates in the astable portion of its characteristic, thereby oscillating freely. Variable feedback for the circuit is provided through resistor 104. Oscillators 10–12 differ from oscillator 9 only in that they are each tuned to a different frequency in the voice-frequency band. Of course, any other type of oscillator capable of producing a sharply defined output in the aforementioned band would be suitable for use in connection with the present invention. With the oscillators shown, a buffer amplifier may be required between the outputs of the oscillators and conductor 106 whenever the number of lines to be tested at any one time is large.

Returning now to Fig. 4, the operation of relay ON completes an obvious path through the upper or operating winding of relay TT. The current flow in this winding is in a direction to operate relay TT. However, the operation of relay ON also completes a path through the lower or biasing winding of relay TT which extends from ground through normally closed contacts TGK, conductor 109 and the lower winding of relay TT to normally open contacts ON and battery. The current in the lower winding is in a direction to hold relay TT on its back contacts and is sufficient to overcome the effect of the oppositely poled current in the operating winding.

Another result of the operation of relay ON is the charging of capacitor 48 in the timing circuit of Fig. 5. Current flowing from positive battery passes through conductor 49, variable resistor 50, conductor 51, capacitor 48, conductor 52, normally open transfer contacts 4–ON and normally closed transfer contacts C3 to the winding of timing relay TM and ground. This charging current is insufficient to operate relay TM. Capacitor 94 is provided to protect the timing circuit from voltage transients which might appear in the positive battery supply. The function of this timing circuit in connection with a major office alarm will be hereinafter discussed.

In Fig. 4, capacitor 53 in the circuit of relay OT is normally discharged, ground being applied to the left-hand terminal thereof over a path through conductor 54, normally closed transfer contacts ON, conductor 55 and current limiting resistor 56. Upon the operation of relay ON, capacitor 53 begins to charge over a path from ground through capacitor 53, resistor 56, conductor 55, normally open transfer contacts ON and the lower or biasing winding of relay OT, to normally open contacts ON and battery. This resulting flow of current is in a direction to hold relay OT on its back contacts and is sufficient to overcome the current flowing over an obvious path in the upper or operating winding. After a time, the charging current for capacitor 53 decays to the point where the upper winding controls and relay OT operates. The parameters of the circuit are so arranged that this charging time is sufficient to permit oscillator 9 to become stabilized.

The operation of relay OT results in the operation of test group No. 1 relay TG1 over a path from ground through normally closed contacts 5–TA and 5–RC, conductor 108, normally open contacts ON and OT, normally closed contacts 5–B1 and the winding of relay TG1 to conductor 58 and battery. In Fig. 5 relay TG1, when operated, operates transfer relays G1–G5 and activates lamp 59 over obvious paths. The operation of relays G1–G5 results in the operation of test group check relay TGK1 over a path from ground on conductor 60 through normally open contacts G5, G4, G3, G2, and G1 to the winding of relay TGK1 and battery. The manner in which the operation of this relay disables a minor alarm circuit will be hereinafter more fully discussed. In the summing circuit of Fig. 3, the operation of relay G1 results in the transfer of line relay outputs 61–63 from the VGS relays of the switching equipment to the summing resistors 4. Similarly, the other transfer relays G2–G5 transfer the remaining line relay outputs (not shown) of test group No. 1.

In Fig. 4, the operation of relay TG1 completes an obvious path for the operation of test group check relay TGK which, when operated prevents the subsequent tripping of a major alarm. This function will be hereinafter more fully discussed.

Returning now to Fig. 3, the operation of relay TG1 results in the application of the output of oscillator 9 to each of the lines, such as line 1, comprising test group No. 1. The signal passes from oscillator 9 to conductor 105, through normally open contacts 4–TG1 and conductor 106 to transformer 2 and ground. The signal is induced by transformer 2 into a circuit extending from the transformer through normally closed contacts HM, tip conductor of line 1, normally closed switchhook contacts 107, winding of transformer 29, capacitor 90, ring conductor of line 1 and normally closed contacts HM to capacitor 3 and the transformer 2. The transformer-capacitor input arrangement is used to ensure that the line will be "balanced," i.e. that noise-producing ground currents will not flow. The left-hand winding of transformer 29 is included in the input 28 to amplifier 27. The amplifier 27 consequently applies an amplified signal of the same frequency as produced by oscillator 9 to that one of tuned branches 13–16 to which rotary switch 64 has been turned. Such amplification can take place only in the event the receiver off-on control (not shown) has been turned on because otherwise the amplifier is deenergized.

In a manner which has been heretofore explained, the output of amplifier 27 will encounter a low impedance path and consequently a large current will flow through this path and through bridge diode rectifier 26 in the event the branch which is connected to the circuit is tuned to the output of oscillator 9. As mentioned above, if the receiver is not turned on, normally open contacts in the amplifier power supply circuit 30 will be open and no signal will be applied to the tuned branches. The large current flowing through branch 13 as a result of the correspondence of the applied frequency and its resonant frequency flows through rectifier 26 and results in the flow of sufficient output current to operate relay CM over an obvious path. The operation of relay CM joins the ring and the tip conductors of line 1 together through inductor 31. The impedance of inductor 31 is sufficient at the frequencies produced by oscillators 9–12 to avoid any chattering of relay CM due to the bridging effect of the shunt.

Line relay L1, as a result of the operation of relay CM, is operated over a path from ground through the winding of transformer 2, normally closed contacts HM, the tip conductor of line 1, inductor 31, normally open contacts CM, the ring conductor of line 1, normally closed contacts HM, to the winding of line relay L1 and battery. Normally this operation of line relay L1 would result in an indication of an originating call in the central office and would either result in the operation of the automatic switching equipment or in the activation of a light on the operator's board, as the case may be. Thus, in the summing circuit the result of the operation of relay L1 would normally be the completion of a path from ground on conductor 65, through normally open contacts L1, normally closed transfer contacts 5–G1, conductor 61 and the winding of relay VGS to conductor 66 and battery. However, transfer contacts 5–G1 are operated as a result of the operation of relay TG1. Therefore the current flow due to the operation of line relay L1 is diverted from conductor 61 to resistor 4, conductors 5 and 6, resistor 67 and battery.

The number of participating receivers which are tuned to the particular channel for which a test is made will correspond to the number of lines which have their CM and line relays operated. This condition can be determined readily by measuring the current flow through resistor 67. This results from the fact that the operation of each of relays L1–L3, L4–L6, or L7–L9, as the case may be, connects another resistor 4 in parallel between conductors 65 and 5, thereby incrementally increasing the current in resistor 67. It may thus be seen that the current flowing through resistor 67 is a function of the number of line relays L1–L9 which are operated. Resistor 4 and resistor 67 may be selected in such a way that the current through resistor 67 is an approximately linear function of the number of lines 1 which have their line relays L– operated. Such an arrangement, however, will result in the voltage across resistor 67 being very small and a high-gain amplifier 68 is therefore required between the summing circuit and the windings of indicating instrument 7. Alternatively, amplifier 68 may be omitted and the values of resistor 4 and resistor 67 may be selected to provide sufficient voltage to operate meter 7 in a direct, although non-linear, fashion.

Figure 2:
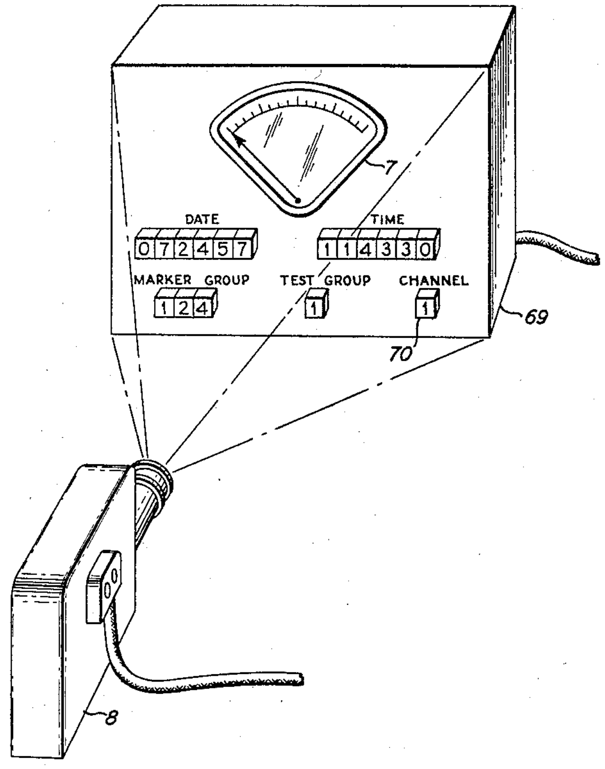
Fig. 2 is a sketch depicting the relationship of an automatic camera and a data read-out device.

Referring now to Fig. 2, the meter 7 may be mounted in panel 69 which is positioned in the field of view of automatic camera 8. In the face of the panel may be installed a number of visual read-out devices 70 of the type described in application Serial No. 617,196, filed October 19, 1956, by V. F. Blefary and M. Ignatowitz for a Visual Display Apparatus. All of bulbs 39–42 (Fig. 5) may be included within unit 70. When the bulb 39, corresponding to the first channel, is activated the digit "1" appears on the face of unit 70; when the bulb 40, corresponding to the second channel, is activated the digit "2" appears on the face of unit 70; and so on. The other individual units on the face are of the same type. Data concerning the date and time may be automatically obtained in any number of well-known ways. Under certain circumstances it may be desirable to also display on the face of the panel the marker group number (relating to the No. 5 crossbar unit which performs the particular test). The group number may be obtained in a manner similar to that used in obtaining the test group numbers.

It should now be recalled that the operation of the TG1 relay resulted in the operation of test group check relay TGK. In Fig. 4 the operation of this latter relay opens the shunting path over conductor 109 for capacitor 71 in the biasing winding circuit of relay TT. Initially the surge of charging current for capacitor 71 through current-limiting resistor 72 is sufficient to hold relay TT against its back contacts. The magnitude of the charging current gradually decays, however, and after a time the upper or operating winding controls and operates relay TT. The parameters of this charging circuit are so arranged that the time is sufficient for both the operation of the slowest L– relay and the stabilization of the movement of meter 7. The operation of relay TT results in the operation of test group end relay TGE over an obvious path. The operation of this latter relay actuates automatic camera 8 (Figs. 2 and 3) which takes a photograph of the data displayed on the panel face, including the position of the meter needle.

Of course, other methods of detecting and recording the condition of the L– relays will be obvious to those learned in the art and the invention described and disclosed herein could be advantageously used with any of such methods. For example, an oscilloscope could be used in place of meter 7.

In Fig. 5, the operation of relay TGE completes a locking path for relay TGK1, partially prepares a path for the operation of minor alarm relay AL1, and operates stepping relay B1 over a path from ground through normally open contacts 4–TGE and normally closed transfer contacts C1 to the winding of relay B1 and battery. In Fig. 4 the operation of relay B1 results in the opening of normally closed contact 5–B1 in the operating winding circuit of relay TG1 thereby causing TG1 and all nonlocked relays operated by this relay to release. As a result relays G1–G5, the CM relay (Fig. 3) at each participating receiver owner's premises, relays L1–L3, meter 7, and the relay TGK (Fig. 4) all release. Lamp 59 in Fig. 5 is extinguished and conductor 106 in Fig. 3 is disconnected from oscillators 9–12.

The release of relay TGK (Fig. 4) discharges capacitor 71 over a path from ground through normally open contacts ON, capacitor 71, current-limiting resistor 72, and conductor 109 to normally closed contacts TGK and ground. The increased flow of current in the lower or biasing winding of relay TT takes control and drives relay TT to its back contacts. Consequently, relay TGE releases, as a result of the opening of normally open contacts TT in the operating winding circuits of relay TGE. The release of relay TGE results in the release of relay TGK1 in Fig. 5 and operates and locks stepping relay C1 in a manner about to be described. Relay B1 was previously operated over a path from ground through normally open contacts 4–TGE, normally closed transfer contacts C1 and the winding of relay B1 to battery. Upon the operation of relay B1 a second conductive path for the flow of current through the winding of relay B1 is extended from ground through normally closed contacts RC, the winding of relay C1 and normally open contacts B1 to the winding of relay B1 and battery. No current flows through the winding of relay C1 in this path, however, because both ends of the path are at ground potential. The release of relay TGE removes ground from the right terminals of relays B1 and C1. Accordingly current flows from ground through the above-described series path holding relay B1 operated and operating and locking relay C1. The operation of relay C1 completes in Fig. 4 an operating path for relay TG2 which extends from ground through normally closed contacts 5–TA and 5–RC, conductors 108 and 57, normally open contacts 5–C1, normally closed contacts 5–B2 and the operating winding of test group No. 2 relay TG2 to conductor 58 and battery. The aforementioned sequence which has been described for the case of test group No. 1 again occurs following the operation of relay TG2, but now results in the testing of the lines in group No. 2 and the actuation of lamp 93. At the completion of the testing of test group No. 2, relay TGE operates again.

When relay TGE operates at the completion of the testing of group No. 2 stepping relay B2 is operated over a path from ground through normally open contacts 4–TGE, normally open transfer contacts C1, conductor 73, normally closed transfer contacts C2 and the winding of relay B2 to battery. When relay TGE releases at the end of the test of group No. 2, stepping relay C2 is operated over a path from ground through normally closed contacts RC, the winding of relay C2 and normally open contacts B2 to the winding of relay B2 and battery. A similar sequence results in the operation of stepping relays B3 and C3 during and at the end of the test of group No. 3 respectively.

Relay C3 is effective to initiate a number of functions which serve to return the control equipment to normal and to prepare it for the test of another channel. The operation of relay C3 results in the recycling of the timing circuit by discharging capacitor 48 and in Fig. 4 discharges capacitor 53 over a path from ground through capacitor 53, current limiting resistor 56 and conductor 55 to normally open contacts 5–C3 and ground. In addition, current flowing from ground on conductor 55 through normally open contacts ON and the lower winding of relay OT to normally open contacts ON and battery more than offsets the current flowing through the upper winding, thereby driving relay OT to its back contacts.

Also in Fig. 4, the operation of relay C3 locks all operated ST– relays by completing an auxiliary path around the normally closed RST– contacts. Reset relay RST–1 is operated over a path from ground through the winding of relay RST–1, normally open transfer contacts P1 and conductor 74 to normally open contacts 5—3 and battery. Although higher-numbered P– relays may be operated, their associated RST– relays will not operate because the operation of relay P1 opens the path between battery and the lower part of conductor 75 to which these relays are connected. Relay RST1 is locked to battery over a path from ground through the winding of relay RST1, conductor 76, normally open contacts RST1 and conductor 77 to normally open contacts ST1 and battery.

Slow-operating and slow-releasing release count relay RC (Fig. 5) is operated by relay C3. The operation of relay RC is delayed for a period of time which is sufficient to ensure the operation of relay RST1 and the discharge of capacitor 53. The operation of relay RC interrupts the operating circuits for stepping relays B1–B3 and C1–C3 in Fig. 5.

Relay C3 releases and in Fig. 4 interrupts the holding circuit for relay ST1, causing it to release, and removes the shunt from capacitor 53, causing it to charge again. In Fig. 5, relay C3, when released, removes the shunt from capacitor 48 in the timing circuit and interrupts the winding circuit for slow-releasing relay RC. Relay RC remains unreleased for a period of time which is sufficient to ensure that all of relays B1–B3 and C1–C2 have released. If no other ST– relays are operated, indicating that no other channels are to be tested, relay ON releases, discharging capacitors 53 and 48 and setting the control circuit at rest.

Because of the high speed inherent in the aforementioned testing procedure, it is to be expected that key NLK1 will not be manually returned to normal in the time required for the completion of the test. In order to prevent an immediate retest of the same channel when key NLK1 is still closed at the end of the test, the locking circuit for relay RST1 serves to hold the circuit for the winding of relay ST1 open by remaining operated over a path from conductor 77 through conductor 36, the one side of line 33, to key NLK1 and battery. When the key is returned to normal, relay RST1 releases, restoring the operating path for relay ST1.

The earlier mentioned release of relay ST1 results in the release of preference relay P1. The release of P1 extinguishes lamp 39 (Fig. 5) and opens the power supply circuit for oscillator 9 (Fig. 3). The subsequent action of the circuit is dependent upon the status of the remaining ST– relays. In the event a higher-numbered ST– relay is operated, its associated P– relay will already have been operated, and such P– relay will take control immediately. If more than one P– relay is operated the lowest-numbered one will control because of the preference chain superimposed on conductor 78 (Fig. 3) in the oscillator supply circuit. Accordingly, the preference chain superimposed on conductor 37 is required in order to ensure that a lower-numbered oscillator will not be substituted for a higher-numbered one while the latter is applying test tone to the lines, such as line 1. This substitution would occur whenever a test is under the control of a higher-numbered P– relay and a lower-numbered P– relay operates. The effect of the aforementioned preference chain in conductor 37 is to prevent such an occurrence. A subscriber's request for the test of a lower-numbered channel results in the operation and locking of the corresponding ST– relay. The corresponding P– relay does not operate until the higher-numbered P– relay releases at the completion of its test. Then the P– relay corresponding to the lower-numbered ST– relay operates and takes control. In the event two or more lower-numbered ST– relays are operated the lower-numbered P– relay associated with these ST– relays will operate and control.

In the event no ST– relays are operated the control circuit will stand idle. The contacts of off-normal relay ON are arranged to minimize the current drain under these conditions.

*Interference with telephone service*

The present invention does not test busy lines since hold magnets (associated with contacts HM in Fig. 3) or cut-off relays, depending upon the type of central office equipment in use, operate whenever the line is in use. Therefore the testing equipment applies signal to only a disconnected stub of the busy line. Incoming calls are not interfered with because the central office operates the hold magnets associated with contacts HM when connecting the calling party's line to line 1, thereby disconnecting the testing equipment. The relay CM is arranged to release in a shorter time than is required by the switching equipment or operator to apply ringing signal to the line. Thus the presence on an incoming call of a direct current shunt across line 1 when the hold magnets associated with contacts HM are operated will not falsely trip the ringing signal.

Originating calls placed during a test are delayed until transfer contacts, such as 5–G1, return to normal. This delay amounts to a fraction of a second and is not noticeable to a telephone customer. Such an originating call would falsely appear to the summing circuit as an operation of relay CM. The probability of a call at any given time is known or can be computed in mose offices and therefore suitable allowances may be made in examining the film record of a test. In any case, the number of calls originated during the progress of a test on any particular test group would be very small. Normally closed switchhook contact 107 is included in the circuit to prevent the chattering of relay CM whenever the voice currents over line 1 correspond to the frequencies to which branches 13–16 are tuned.

*Trouble alarms*

The above-described equipment is provided with major and minor trouble alarms at the central office. Trouble which would interfere with normal use of the telephone line 1 for communication or which might seriously impair the validity of the test is reported to the office alarm circuits 95 over conductor 79 (Fig. 5) as a major alarm. Representative of the latter condition would be the failure in Fig. 4 of one of relays TG1–TG3 to operate, thereby omitting from the test all of the receivers in an entire test group. Should relay TG2 fail to operate, for example, test group check relay TGK would not operate, thereby stopping the further progress of the testing. In the timing circuit of Fig. 5 variable resistor 50 is set to a value which is a function of the number of groups to be tested. The time constant of the resistor 50-capacitor 48 charging path is set in such a manner that the voltage on the control anode 80 of cold cathode tube 81 reaches breakdown potential shortly after the expiration of sufficient time for the completion of testing.

When such a breakdown takes place a low impedance circuit for the winding of relay TM is provided from positive battery on conductor 49, through tube 81, conductor 52, normally open contacts 4–ON and normally closed contacts C3 to the winding of relay TM and ground. Relay TM locks through conductor 92, normally open contacts TM, and conductor 52 in the above-described circuit, thus protecting tube 81.

However, if the complete testing sequence has occurred properly, relay C3 will operate before tube 81 fires. Relay TM is thereupon prevented from operating and capacitor 48 is discharged over a path from conductor 52, normally open contacts 4–ON and C3, conductor 82, current-limiting resistor 83, conductor 51, to capacitor 48 and conductor 52 by the operation of stepping relay C3 at the completion of the test of the last test group. If this last test does not take place within the allotted time relay TM operates, resulting in the operation and locking of trouble alarm relay TA over an obvious path. The operation of relay TA completes a locking path for relay TGE and actuates a major office alarm by connecting conductor 79 to battery. The operation of relay TGE prevents the further operation of stepping relays B1–B3 and C1–C3. Thus a repairman is able to identify the faulty test group by inspecting the stepping relays and determining at what point they locked in the test group sequence. The identification of the faulty test group must be accomplished indirectly because the operation of relay TA opens the winding circuits for relays TG1–TG3 (Fig. 4) in order to ensure that trouble in the control system will not interfere with conventional telephone service. After the trouble has been cleared normally closed nonlocking key NLK8 in the holding circuit for relay TA is manually operated and the alarm is cancelled by the release of relay TA.

Trouble which would not interfere with the normal use of telephone line 1 and which would not seriously impair the validity of the test is reported to the office alarm circuits 95 over conductor 84 as a minor alarm. Representatives of the latter condition would be the failure of one of relays G1–G5, G6–G10, or G11–G15 to operate. It has been hereinbefore stated that a single test group may comprise 1000 lines 1. Should each G– relay be equipped with eleven contacts, ten for transfer purposes and one for checking, 100 relays would be required for each test group instead of the five shown. Therefore, the failure of any particular G– relay would not be serious.

Parallel conductors 85, 86, and 87, each in series with the winding circuit of test group check relay TGK1, are connected in series with the eleventh contacts of each G– relay in their respective test groups. The conductors are connected in parallel in order that the operation of all G– relays in any one test group will result in the operation of relay TGK1. For example, when relay TG2 operates, relay TGK1 is normally operated over a path from ground, through conductor 60, and normally open contacts G10, G9, G8, G7, and G6 in conductor 86, to the winding of relay TGK1 and battery. The operation of relay TGE results in the locking of relay TGK1 over a path from ground, through normally open contacts 4–TGE and TGK1 and conductor 88 to the winding of relay TGK1 and battery. This locking takes place in order to prevent a false alarm when the TG– relays are released at the end of each test. The operation of relays TG2 and TGE partially prepares an operating path for alarm relay AL2 which extends from ground through normally open contacts 4–TGE, normally closed contacts TGK1 (which should be open) and normally open contacts 4–TG2 to the winding of relay AL2 and battery. In the event relay TGK1 does not operate because of a failure of one of the G– relays, alarm relay AL2 will be operated over the aforementioned circuit. When operated, relay TGK1 prevents the circuit for relay AL2 from being completed by opening the pair of normally closed contacts TGK1.

When operated, relay AL2 locks itself over a path from ground on conductor 89 through normally closed nonlocking key NLK6 and normally open contacts of relay AL2 to the winding thereof and battery. The operation of relay AL2 connects conductor 84 to battery, thereby actuating a minor office alarm. The operation of this minor alarm does not halt testing as does the operation of the major alarm. The location of the trouble can be determined by observing which of relays AL1–AL3 is locked in an operated position. After the trouble has been cleared normally closed nonlocking key NLK6 in the locking circuit for relay AL2 is manually operated and the alarm is cancelled by the release of relay AL2.

The invention has been described above with reference to a particular embodiment thereof for collecting data concerning the condition of broadcast receivers. It will be evident, however, to one skilled in the art, that said invention is not limited to the particular embodiment disclosed or to use with any particular type of telephone system, but that various applications, modifications, and arrangements other than those disclosed herein are within the scope of the invention. Thus any condition representable by discrete steps, as for example the rate of flow of tap water supplied to houses, could be reported and totalized, if required, by modification of the invention which will be apparent to those skilled in the art. Further, the number of frequencies used and therefore the number of conditions to be tested for is limited only by the cost and state of the art of constructing more sharply discriminating tuned circuits and oscillators.

What is claimed is:

1. Apparatus comprising a first device adjustable to any one of a plurality of conditions, means for generating signals of frequencies severally corresponding to said conditions, a plurality of electrical devices selectively tuned to the corresponding frequencies, means interconnecting said signal generating means with said electrical devices, means connected to said first device for rendering each one of said electrical devices responsive to the application of a signal of corresponding frequency only when said first device is adjusted to the corresponding condition, and means connected to said interconnecting means for selectively indicating the electrical response of said electrical devices.

2. Apparatus according to claim 1 wherein said electrical devices comprise tuned circuits.

3. Apparatus comprising a first device adjustable to any one of a plurality of conditions, means for generating signals of frequencies severally corresponding to said conditions, a plurality of circuits selectively tuned to the corresponding frequencies, means including a telephone line interconnecting said signal generating means with said tuned circuits, means connected to said first device for rendering each one of said tuned circuits responsive to the application of a signal of corresponding frequency only when said first device is adjusted to the corresponding condition, and means connected to said interconnecting means for selectively indicating the electrical response of said tuned circuits.

4. Apparatus according to claim 3 wherein said first device comprises broadcast receiver program selecting apparatus.

5. Apparatus comprising a first device adjustable to any one of a plurality of conditions, a telephone central office, means located at said central office for generating signals of frequencies severally corresponding to said conditions, a plurality of electrical devices selectively tuned to the corresponding frequencies, means including a telephone line interconnecting said signal generating means with said electrical devices, means connected to said first device for rendering each one of said electrical devices responsive to the application of a signal of corresponding frequency only when said first device is adjusted to the corresponding condition, and means connected to said interconnecting means at said central office for selectively indicating the electrical response of said electrical devices.

6. Apparatus according to claim 5 wherein said electrical devices comprise tuned circuits.

7. Apparatus according to claim 5 wherein said means connected to said interconnecting means comprises a line relay, a transfer relay, and a summing circuit.

8. Apparatus according to claim 5 wherein said electrical devices comprise tuned circuits; said means connected to said interconnecting means comprises a line relay, a transfer relay, and a summing circuit; and said first device comprises broadcast receiver program selecting apparatus.

9. Condition indicating apparatus comprising a device adjustable to any one of a plurality of conditions, means at a first location for registering the several conditions in which said device may be adjusted, means at a second location for generating a plurality of first signals severally representative of said conditions, a telephone line interconnecting said first and said second locations, means at said second location for applying said first signals to said line, means at said first location including said condition registering means for applying a second signal to said telephone line in response to the receipt over said telephone line of a first signal which represents the condition to which said device is adjusted, and indicating means at said second location responsive to the receipt of said second signal.

10. A condition measuring system comprising a device adjustable to any one of a plurality of conditions, a telephone central office, means at a first location for registering the several conditions to which said device may be adjusted, means at said central office for generating a plurality of first signals severally representative of said conditions, a telephone line interconnecting said first location and said central office, means at said central office for selectively and sequentially applying said first signals to said line, means at said first location including said condition registering means for applying a second signal to said telephone line in response to the receipt over said telephone line of a first signal representing the condition to which said device is adjusted, and indicating means including a line relay and a transfer relay connected to said line at said central office responsive to the receipt of said second signal.

11. A condition indicating system comprising a telephone central office, a plurality of telephone lines terminating at said central office, a plurality of first devices each adjustable to any one of a plurality of conditions, a corresponding plurality of electrical devices severally associated with said first devices to form first device-electrical device pairs, each one of said electrical devices comprising a plurality of circuits tuned to different frequencies severally representing said plurality of conditions, means interconnecting each one of said first devices to its associated electrical device responsive to the condition to which the connected first device is adjusted for rendering electrically effective the circuit tuned to the frequency representing said condition, means for connecting a different one of said electrical devices to each of said telephone lines, a plurality of oscillators each effective to generate a signal of a different one of the frequencies to which each of said plurality of circuits is tuned, means for sequentially connecting said oscillators to said telephone lines, means connected to each electrical device for generating a characteristic signal in response to the connection of one of said oscillators to said telephone lines whenever the frequency of the connected oscillator is the frequency to which the electrically effective circuit within the electrical device is tuned, and means connected to said telephone lines for recognizing the number of said characteristic signals generated when each of said oscillators is connected to said lines, thereby effectively counting the number of said devices which are adjusted to each of said conditions.

12. In a telephone system, a plurality of multiline telephone cables, means for grouping certain of the lines from each cable to form a first group, means for grouping certain others of the lines from each cable to form a second group, and means for applying an electrical test potential to said groups of lines in group sequence.

13. A condition prevalence measuring system comprising a plurality of devices each adjustable to any one of a plurality of discrete conditions, a first means associated with each of said devices for establishing any one of a plurality of electrical conditions, said electrical conditions severally corresponding to said discrete conditions, each of said first means being adapted to establish a particular electrical condition whenever its associated device is adjusted to the corresponding discrete condition, a plurality of telephone lines collected in a subplurality of multiline cables, grouping means for grouping certain of the lines from each cable to form a first group and for grouping certain others of the lines from each cable to form a second group, means for severally connecting certain of said first means with the telephone lines of said first group and for severally connecting others of said first means with the telephone lines of said second group, and means including said grouping means connected to said telephone lines for initially detecting the electrical condition of each of certain of said first means and for determining the total number of said certain of said first means which have established any particular electrical condition, said last-mentioned means being further effective to subsequently detect the electrical condition of each of said others of said first means and for determining the total number of said others of said first means which have established any particular electrical condition.

14. In combination, a telephone central office, a plurality of telephone instruments each situated at a different customer location, a plurality of telephone lines each connecting a different one of said telephone instruments with said central office, each telephone line having a line relay operative when said each telephone line is bridged, a plurality of program receivers each having a plurality of program channels and a manually adjustable program selecting device for selecting any one of said program channels to the substantial exclusion of the others, each different one of said receivers being associated with a different one of said telephone instruments, and means for determining the number of program receivers adjusted to any of said channels; said determining means including oscillator means for generating a plurality of tones each of a different frequency and each corresponding to one of said program channels, means for applying any one of said tones to a plurality of said telephone lines simultaneously, detection means at each customer location, each of said detection means comprising a plurality of resonant circuits severally tuned to the frequencies of said tones, means coupled to the program selecting device of the receiver at said each of said customer locations for selectively connecting said resonant circuits in circuit with the telephone line connected to the associated telephone instrument, the one of said resonant circuits connected in circuit with said telephone line being tuned to the one of said tones corresponding to the program channel to which said receiver at said each of said customer locations is adjusted, line-bridging means at each of said customer locations responsive to the application of a tone to the associated telephone line when the one of said resonant circuits connected to said associated telephone line is the resonant circuit tuned to the frequency of said a tone for operating the line relay of said associated telephone line, and means at said central office for ascertaining the number of operated line relays.

15. The combination defined in claim 14 in combination with means for preventing the application of any one of said tones to any one of said telephone lines while said any one of said telephone lines is in service.

16. The combination defined in claim 14 in combination with means for grouping said telephone lines into a plurality of groups, and means for applying said tones to said groups in group sequence.

17. The combination defined in claim 14 in combination with means for sequentially applying each of said tones to said plurality of telephone lines and means for recording the number of operated line relays between the application of each successive tone.

References Cited in the file of this patent

UNITED STATES PATENTS

| | | |
|---|---|---|
| 2,630,365 | Rahmel | Mar. 3, 1953 |
| 2,761,922 | Carroll | Sept. 4, 1956 |
| 2,788,392 | Krahulec | Apr. 9, 1957 |
| 2,819,354 | Shoffstall | Jan. 7, 1958 |